(12) United States Patent
Margulius et al.

(10) Patent No.: US 6,732,443 B1
(45) Date of Patent: May 11, 2004

(54) DIGITAL KERF MEASUREMENT APPARATUS AND METHOD

(76) Inventors: Harry Margulius, 1012 Keith Ave., Berkeley, CA (US) 94708; Dennis Deschene, 21 Harriman Rd., Plaistow, NH (US) 03865; Michael Therrien, 1220 Belmont St., Manchester, NH (US) 03104; Giorgio Bruschi, 72 Washington Ave., Acton, MA (US) 01720

( * ) Notice: Subject to any disclaimer, the term of this patent is extended or adjusted under 35 U.S.C. 154(b) by 0 days.

(21) Appl. No.: 10/314,718

(22) Filed: Dec. 9, 2002

(51) Int. Cl.[7] .................................................. G01B 3/56
(52) U.S. Cl. .............................. 33/531; 33/836; 33/542
(58) Field of Search .......................... 33/531, 832, 833, 33/836, 542, 544, 544.2, 544.3, 544.4, DIG. 2

(56) References Cited

U.S. PATENT DOCUMENTS 5,189,808 A * 3/1993 Evans et al. .................. 33/836
6,031,200 A * 2/2000 Whitehouse ........... 219/121.67

* cited by examiner

Primary Examiner—Christopher W. Fulton
Assistant Examiner—Amy R. Cohen
(74) Attorney, Agent, or Firm—William B. Ritchie (57) ABSTRACT

An in-process kerf measuring device and method of using thereof, for measuring a kerf made from a cutting device. The device includes a taper gauge having a top and bottom, the taper gauge being a predetermined shape and size and capable of probing the kerf. The device also includes a spring coiled around the taper gauge, a shaft having a top and a bottom, the top of the shaft is in mating relation to the bottom of the taper gauge, a horizontal connecting plate having a resting position, the bottom of the shaft is rotatably attached to the horizontal connecting plate. The device also includes a stroke means, where the stroke means is in connected relation to the horizontal connecting plate, a measurement means for measuring the kerf and a means for actuation of the device. The method includes first step of rotating a kerf measuring device to a starting position, a second step of thrusting the horizontal connecting plate upward, a third step of thrusting he shaft upward, a fourth step of contacting the workpiece, a fifth step of compressing the spring, a sixth step of probing the kerf with the taper gauge until reaching a stopping position, and a final step of returning to said starting position. The measurement means measures the kerf using the starting point and stopping point.

17 Claims, 12 Drawing Sheets

DIGITAL KERF MEASUREMENT APPARATUS AND METHOD

FIELD OF THE INVENTION

The present invention relates to the field of measurement systems and, in particular, to an apparatus and method for in-process measurement, control and recordkeeping for the manufacture of uniform kerfs, slots or grooves in thick materials, created during material processing.

BACKGROUND OF THE INVENTION

In making cardboard boxes, a wooden die is prepared that is used to crease and cut the cardboard so that it is shaped and subsequently folded accurately. A kerf or narrow groove is made in the plywood that serves to diagonally hold thin steel strips or rule that imprint the cut and fold lines on the cardboard when the die is placed in a press. If the kerf is not accurately cut, the steel rule strips will not be held tightly in the die or will not be in the right position and the cardboard will not be creased or cut properly. This problem is exacerbated by the fact that the wooden dies are often very large.

The laser has long been used for cutting the knifing grooves in flat and rotary dieboards. For many years the technology was limited to the use of 500 watt $CO_2$ lasers with fixed distances from the laser to the focusing lens to cut plywood into desired shapes for use as dieboards. The key processing parameters were the control of the top and bottom kerf dimensions, kerf verticality or perpendicularity to the board surface, and kerf walls that remained within known tolerances of being straight.

From the nature of the laser cutting process, the dieboards were placed on an open faced enclosure or "tub" which would catch scrap material, collect the smoke and fumes for proper exhaust, and provide for safety by eliminating the exposure of the operators to laser radiation. As a consequence of this construction, the bottom of the dieboard is not accessible to the operator during the cutting process, and a "direct" measurement of the bottom kerf width is not possible. Operators check the top kerf width using a taper gauge and use an indirect procedure for determining the correctness of the bottom kerf width dimension by inserting a blade or "rule" into the kerf and "feeling" the resistance to insertion and withdrawal. This is a subjective procedure depending on the instincts of the operator. Often this procedure is repeated several times during the cutting process.

As technology has advanced to higher power lasers and moving optic systems, cutting speed has increased dramatically, and this increase in speed makes it more difficult to control the key process parameters. It is not recognized in the prior art nor has anyone provided a reliable method for determining the bottom kerf width while cutting as this would allow in-process adjustments to be made to key parameters thus producing the highest possible of quality throughput. While the top kerf width is more predictable and readily controlled by focusing techniques, the bottom kerf width is dependent on a "burning" process which can be affected by a number of variables inherent in the plywood being cut, the laser, the motion system, the process environment and system programming.

In current practice, test cuts are made in the plywood in the X and Y directions and checked by inserting a taper gauge or a piece rule to measure the top and bottom kerf width as described above. Laser and motion system parameters are consequently adjusted and additional test cuts are made until the estimated top and bottom widths are correct. Once actual cuts are made in the workpiece, the dimensions may or may not be periodically checked in a similar fashion over the entire board length depending upon its size, material, required accuracy, and operator sensitivity.

As is apparent from the above description, the current measuring process is imprecise and during cutting depends on the subjective actions of the operator. The final product can only be measured in total after the material is fully cut. If there are kerf width problems, the result is increased scrap and wasted machine and operator time down time. Once the dieboard has been cut, the offline measurement of the plywood will require the use of a separate machine measurement system where the kerfs on each side can be viewed accurately by an experienced operator. This secondary operation substantially increased the cost of the product.

Another measuring process that has been proposed in the art is a machine vision system for in-process kerf measurement. This system employs a camera mounted coaxially to the laser cutting beam. The camera is offset from the cutting beam in order to get a clear view of the cut slot after the laser burn residue is eliminated. However, this system has many drawbacks. First, the machine vision system does not provide a direct measurement of the kerf width from the bottom of the dieboard. Second, the quality of the measurement of the bottom kerf is limited by the clarity of the field of view due to the unpredictable nature of the residue exhaust. Finally, the data processing requirements, for processing and analyzing the camera image, is very time consuming and therefore not practical for efficient dieboard processing.

Therefore, there is a need for a system for measuring the kerf of the laser cut plywood dieboard which provides accurate, digital and automatic in-process measurement of the entire kerf, on the bottom as well as the top of the dieboard, thereby making it possible to adjust system variables during the cutting process so that both scrap and machine/operator down-time are reduced.

SUMMARY OF THE INVENTION

In accordance with one aspect of the present invention, an in-process kerf measuring device for measuring a kerf made from a cutting device. The device includes a taper gauge having a top and bottom, the taper gauge being a predetermined shape and size and capable of being inserted into or probing the kerf. The device also includes a spring coiled around the taper gauge, a shaft having a top and a bottom, the top of the shaft is in mating relation to the bottom of the taper gauge, an outer gauge housing that serves to vertically align, contain and provide stability to the taper gauge, spring and shaft, a horizontal plate having a resting position, the bottom of the shaft is vertically retained and rotatably attached to the horizontal plate. The device also includes a stroke means, where the stroke means is in connected relation to the horizontal plate, a measurement means for measuring the kerf and a means for actuation of the device. In practice, the device works as follows: the means for actuation rotates the device planar to the X or Y direction kerf. The device is in the measurement means starting position. The stroke means than thrusts the horizontal plate upward, thrusting the shaft, taper gauge and outer gauge housing upward which after contacting the flat surface of the workpiece acts to compress the spring. This then causes the top or narrowest end of the taper gauge to extend further, probing the kerf until reaching a stopping position. At that stopping point, the measurement means measures the kerf using data collected from the starting position and the stopping position.

Implementation of this aspect of the present invention may include one or more of the following. The stroke means is a linear air or fluid cylinder, the apparatus measuring means is a rotary encoder, the means for actuation is a rotary vane air cylinder, the means for actuation is a stepper motor, the apparatus measuring means is a linear digital encoder.

In accordance with another aspect of the invention, a method for in-process kerf measuring for measuring a kerf made from a cutting device. The method includes a first step of rotating a kerf measuring device to a starting position, where the device includes a taper gauge having a top and bottom, the taper gauge being a predetermined shape and size and capable of probing the kerf. The device also includes a spring coiled around the taper gauge, a shaft having a top and a bottom, the top of the shaft is in mating relation to the bottom of the taper gauge, an outer gauge housing that vertically aligns and contains the taper gauge, spring and shaft, a horizontal plate having a resting position, the bottom of the shaft is slidably attached to the horizontal plate. The device also includes a stroke means, where the stroke means is in connected relation to the horizontal plate, a measurement means for measuring the kerf and a means for rotation of the device. The method also includes a second step of thrusting the horizontal plate upward, a third step of thrusting the shaft, taper gauge, spring and gauge housing upward, a fourth step of contacting the flat surface of the workpiece, a fifth step of compressing the spring, a sixth step of probing the kerf with the taper gauge until reaching a stopping position, and a final step of returning to said starting position.

Implementation of this aspect of the present invention may include one or more of the following. The stroke means is a linear air or fluid cylinder, the apparatus measuring means is a rotary encoder, the means for actuation is a rotary vane air cylinder, the means for actuation is a stepper motor, the apparatus measuring means is a linear digital encoder.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

The present invention, the digital kerf gauge, includes an electro-mechanical computer activated taper gauge implemented with a digital readout. This apparatus is similar to manual taper gauges that are traditionally used in the diemaking industry in order to obtain a "feel" for the tightness of the kerf. The present invention is a major improvement in kerf measurement technology in that it eliminates the major problems found in the prior art. The present invention directly measures the kerf width of the bottom of the dieboard slot via a uniform computer controlled mechanical contact action between the tapered measuring element and the kerf. The present invention provides an instantaneous, automatic and absolute digital numerical value that can be used directly by the expert software system that controls the laser diecutting system.

In its simplest form, a laser die cutting system, used in the art and in tandem with the present invention, includes a material holding fixture that supports a large flat sheet of typically ⅝ inch thick plywood; an electro-material relative motion system that allows coordinated X/Y planar motion between the material and the nozzle that delivers laser energy to the workpiece; a beam delivery and focusing system positively referenced to the motion system that transmits a precisely focused beam of laser energy through the nozzle to the surface of the dieboard; a typically open-faced enclosure or "tub" on which the material is mounted for the purpose of catching laser burn residue, smoke and fumes, as well as for safety eliminating the exposure of the operators to laser radiation; and an "expert" computer motion control system that programs and executes all aspects of the laser die cutting process.

In the preferred embodiment of the present invention, the laser die cutting system using the digital kerf gauge, that is the present invention, is a hybrid system that moves the laser cutting nozzle in the X axis, across the narrow dimension of the rectangular dieboard, and transports the material in the Y axis direction along the long axis of the workpiece dieboard.

The present invention uses, in the preferred embodiment, a custom "tub" or vessel. This tub collects the laser beam residue, dissipates the remaining heat after the beam passes through the material, and protects the operator of the laser die cutting system from laser radiation. The tub or vessel includes a narrow trough aligned with, and mounted directly below, the traveling nozzle that delivers the laser beam to the plywood. This trough is matted in a manner that creates a sandwich effect between the tub and the nozzle. The opening on the tub, located on top of the tub, receives the laser beam and is approximately the width of the laser beam. This tub is fixed while the material mounts on corner posts and moves perpendicularly to and directly above the tub. This closed tub design prevents contaminants and toxic fumes from entering the shop or immediate environment. Additionally, this tub design does not impede the acceleration capability of the cutting system.

Figure 1A:
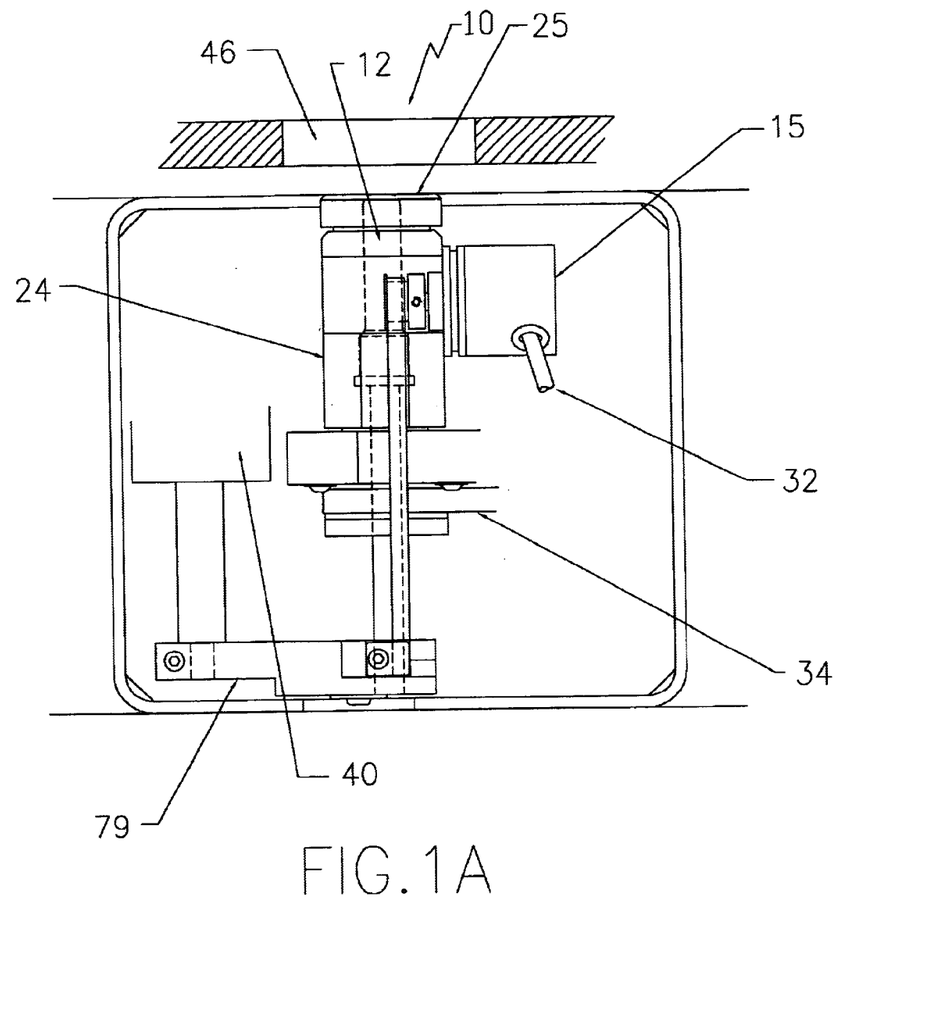
FIG. 1A is a front view of the rotary encoder embodiment of the digital kerf apparatus in the down position.

Referring first to FIG. 1A, one embodiment of the in-process automatic kerf measurement system 10 is shown. The taper gauge 12, in the preferred embodiment, is approximately ½ inch wide by 2 inches long with an approximately 6 degree angle wedge with a round rear flange and shaft bore. In the preferred embodiment, the taper gauge 12 is made from steel or other suitable material that can be accurately machined to high tolerances.

The main body of the gauge is round, allowing clearance for an outer compression spring (not shown) and has a flange area at its bottom. The taper gauge 12 is surrounded by a non-rotating outer gauge housing 24. The outer compression spring is located between the flange area and the top rim 25 of the outer gauge housing 24. The gauge housing 24, in its preferred embodiment, is made from aluminum but in other embodiments, the outer guard housing can be made from steel or other suitable material that would provide stability as well as good mechanical properties.

The entire gauge assembly is surrounded and protected by a main housing or cover 36. In the preferred embodiment, the main housing 36 is made of thermoformed plastic sheet, but in other embodiments, the main housing can be made from sheet steel, aluminum or plastic.

As shown in FIG. 1A, the taper gauge 12 is in the down position and the tip of the taper gauge and the outer top rim 25 of the gauge housing 24 are at the same vertical height. The gauge housing 24 is forced up to that level by the internal compression spring (not shown) that fits around the taper gauge 12 pushing against the flange at the rear of the gauge. The gauge housing 24 moves freely in the vertical direction and it is connected to an approximately 1 inch, limited travel, Delton type ball slide 26 that is mounted on the X-axis carriage 28 that supports the gauge 12 and gauge housing 24 apparatus.

Still referring to FIG. 1A, a rotating, vertical sliding spline shaft 22 attaches concentrically into the bottom of the taper gauge 12 and continues down through the horizontal connecting plate 38 and a flange, splined, sliding, rotary bushing located below the rear of the gauge housing 24. The horizontal connecting plate 38 is fixed to the X-carriage. In the preferred embodiment, the vertical spine slide shaft 22 is also allowed to rotate by virtue of a bronze bearing fixed in the horizontal connecting plate 79 at the bottom of the spline. Shaft 22 allows rotation of the spline shaft while vertically retaining the spline shaft in the horizontal connecting plate 79 with a shaft collar clamp (not shown).

Still referring to FIG. 1A, mounted on the outer gauge housing 24 is a measurement apparatus 15. In one embodiment, shown in FIG. 1A, the measurement apparatus 15 is a rotary encoder apparatus 15 which has an encoder pulley 16/belt 18 combination which, when triggered, produces an absolute numerical or digital count. In another embodiment, the measurement apparatus is a linear digital encoder apparatus (shown as 50 in FIG. 4A).

The belt 18 is threaded through the encoder pulley 16, which allows readings to be done of how much belt 18 has been pulled over the pulley. The counter spring 20 is connected to one end of the belt 18 near the rotary encoder 15 and acts to stabilize the slack of the belt 18. The other end of the counter spring 20 is connected to the stationary horizontal mounting place 38. The other end of the belt 18 is connected to the horizontal connecting plate 79.

Figure 1B:
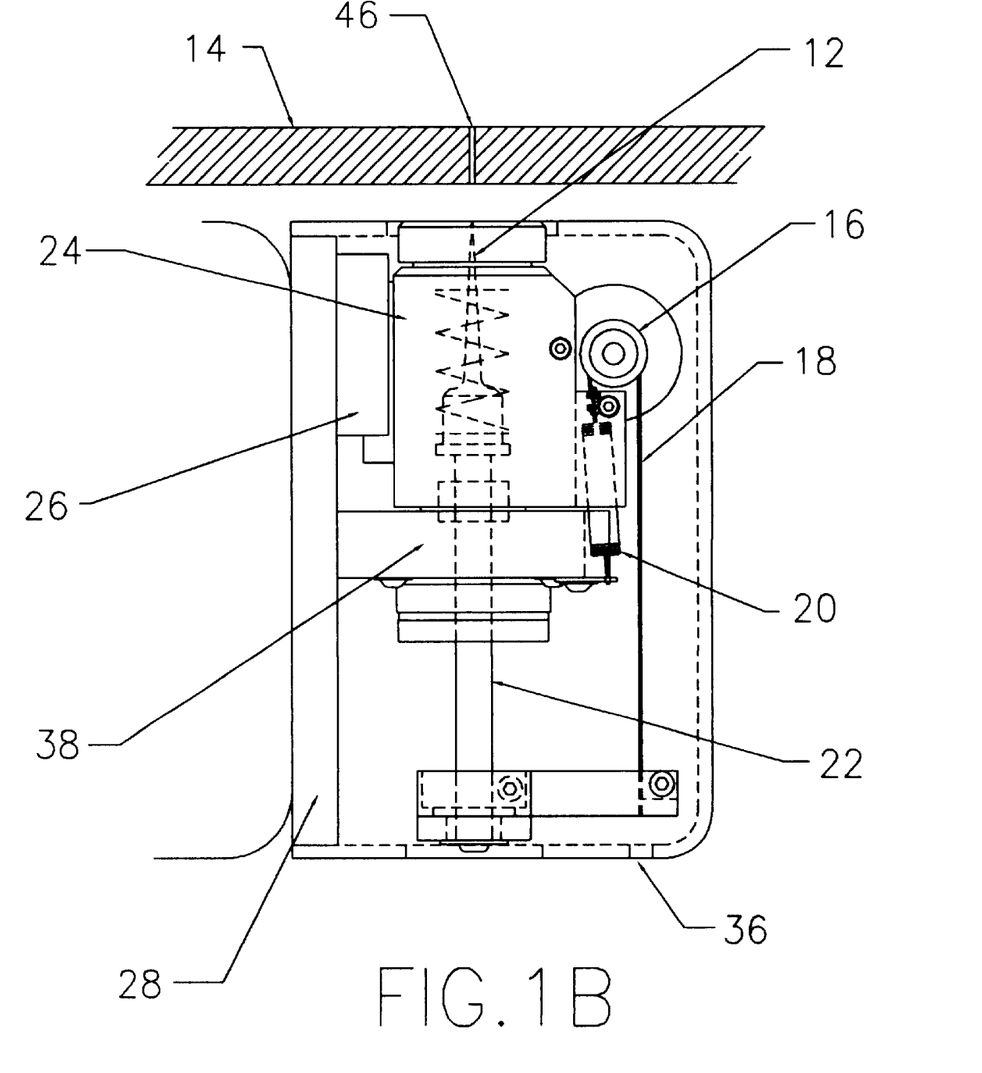
FIG. 1B is a side view of the rotary encoder embodiment of the digital kerf apparatus in the down position.

Referring now to FIG. 1B, a means of rotary actuation (not shown) is connected to the X/Y kerf direction drive belt 34 which allows for X or Y taper gauge 12 reading direction changes. In the preferred embodiment, the means of rotary actuation is a rotary vane cylinder, but in other embodiments it is a stepper motor. By switching the means of rotary actuation on/off, the operator of the present invention can set the taper gauge 12 to read in either an X or Y direction. Without a means of rotary actuation, the present invention would be limited to only X or Y readings.

A stroke cylinder 40 (piston rod end) is connected to the horizontal connecting plate 79. In the preferred embodiment, the stroke cylinder 40 is a vertical air cylinder. In other embodiments, the stroke (means) is a hydraulic cylinder or linear electrical solenoid. The stroke cylinder 40 provides a well controlled 1.3 inches of total up/down vertical motion to the taper gauge 12 mechanism. The stroke cylinder 40 is mounted to the device's X axis carriage on a horizontal mounting plate 38. The stroke cylinder 40 is connected to the spline shaft 22 through the horizontal connecting plate 79, thus, when the stroke cylinder 40 moves the horizontal connecting plate 79, the spline shaft 22 is moved, and therefore, the taper gauge 12 is moved as well.

Referring again to FIG. 1A, in the rotary encoder apparatus, the taper gauge 12 enters the kerf 46 in the dieboard 14, and as the pulley 16 rotates, the belt 18 slack is taken up by the counter spring 20. The amount the pulley 16 rotates correlates to the distance the taper gauge 12 was able to probe inside the kerf 46. Referring now to FIG. 1B, the cable 32 transfers this information to a computer (not shown), which digitally calculates the kerf width. Based on this information, the operator can determine whether the test cut kerf 46 is the correct width, and if not, the operator can change the cutting apparatus in attempt to correct the kerf.

Figure 4A:
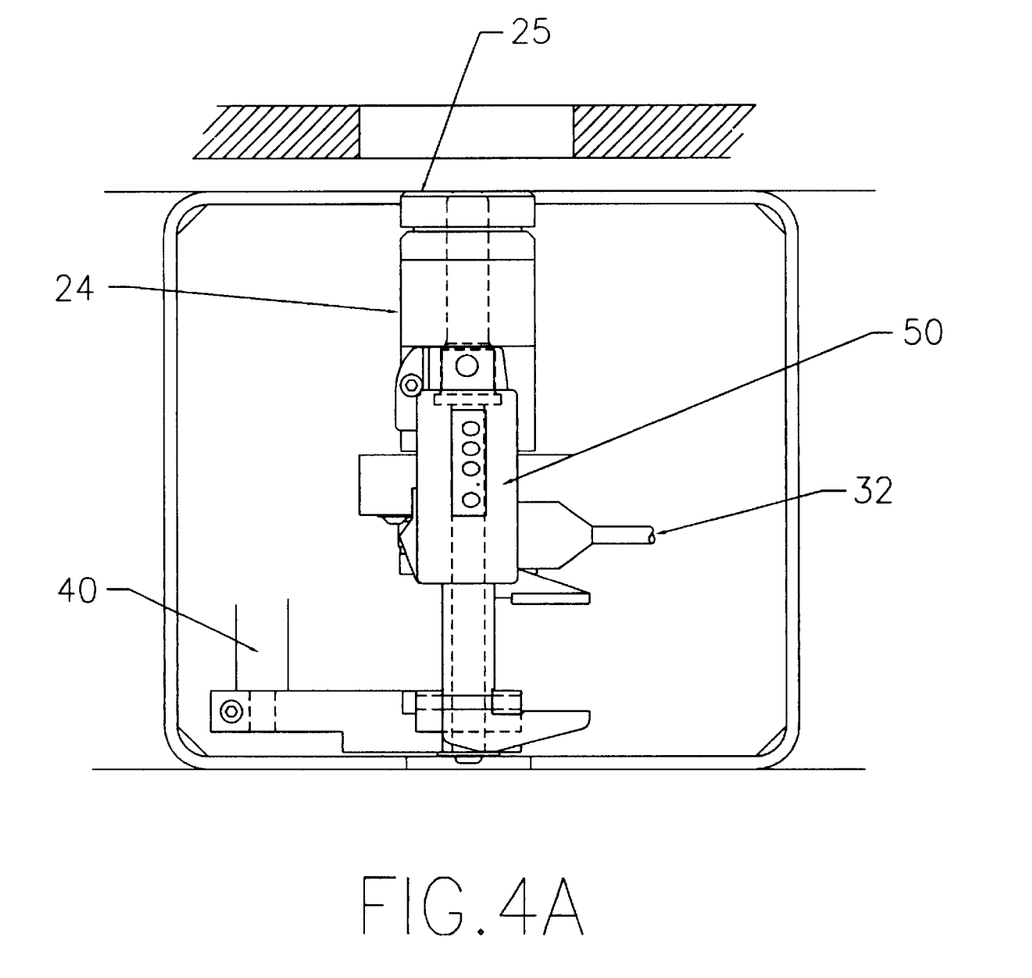
FIG. 4A is a front view of the linear digital encoder embodiment of the digital kerf apparatus in the down position.

Referring now to FIG. 4A, the linear digital encoding embodiment of the digital kerf apparatus 10 is shown. The linear digital encoding embodiment includes all of the same elements as the rotary encoder embodiment (shown in FIG. 1A), except that the measurement apparatus 15 is a linear digital encoder apparatus rather than a rotary encoder apparatus, as shown in FIG. 1A. The linear digital encoder apparatus 50 is a linear measurement device with a computer interface. In the preferred embodiment, the linear measurement device is a digital encoder slidably attached to the vertical X axis carriage plate 28 via the ball slide 26 and the gauge housing 24 and the digital encoder 50 sliding measurement arm is attached to the horizontal connecting plate 79.

Figure 4B:
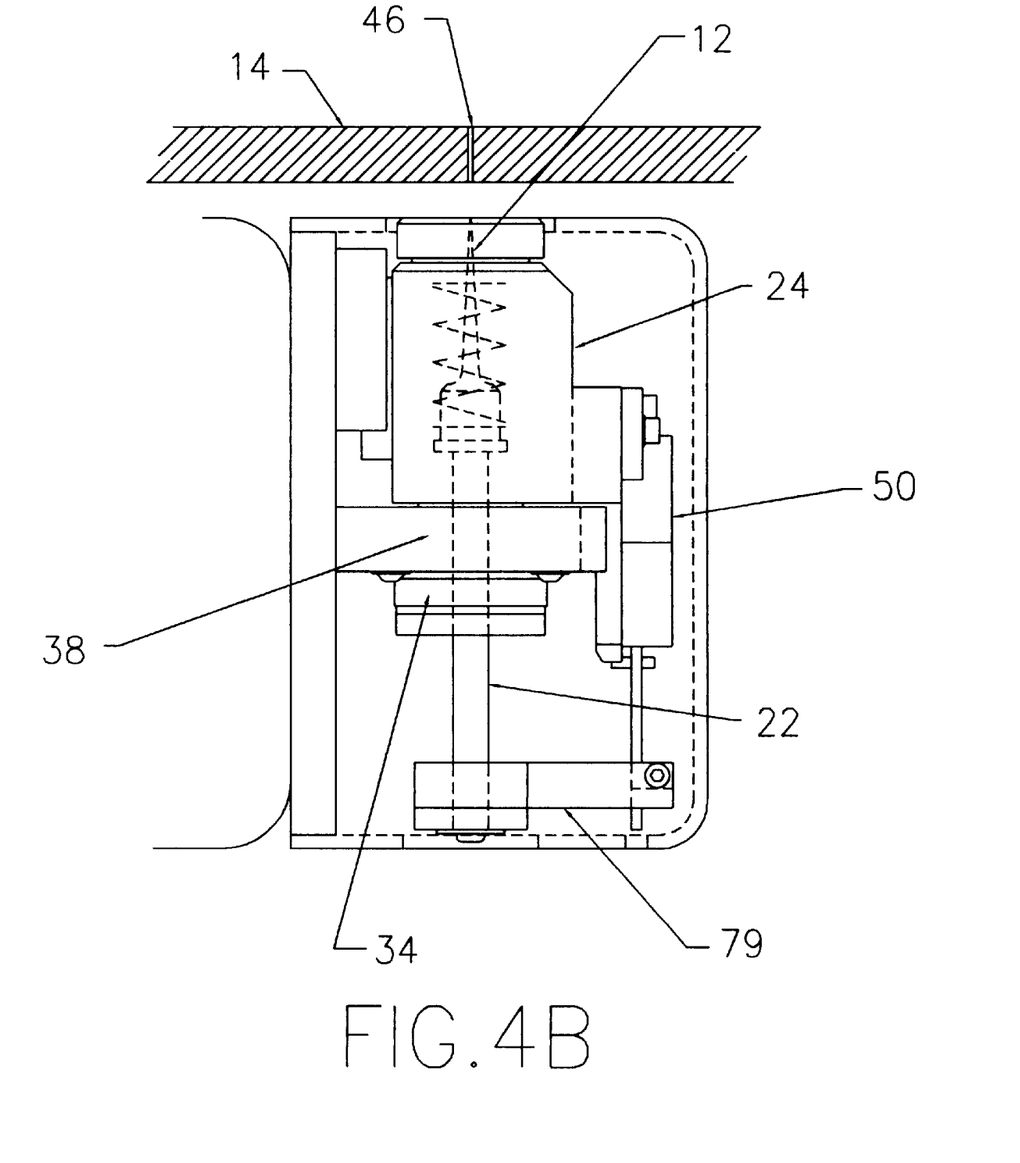
FIG. 4B is a side view of the of the linear digital encoder embodiment digital kerf apparatus in the down position.

Referring now to FIG. 4B, the digital encoder 50, slidably attached to the X axis carriage plate 28, transmits data to the computer via the RS232 cable 32. The digital encoder 50 has approximately 1 inch of total measurable travel and a resolution of approximately 0.001 inch with digital output information encoded in RS232 format. An RS232 interface connector and cable 32 deliver output data, via wired or wireless interconnection, to the expert computer system that controls the laser die cutting process.

Depending on the depth the taper gauge 12 reaches inside the test cut kerf 46 (i.e. the probe distance), the digital encoder 50 measurement arm will be higher or lower on the X axis carriage plate 28. The distance the digital encoder 50 measurement art travels on the X axis carriage plate is translated to the computer via the cable 32 and the status of the kerf is calculated by the computer which compares this data (the stopping point or second report) and the starting report data.

The digital kerf apparatus, in practice, operates the same way in both the rotary encoder and linear digital encoder embodiments. The only difference between the two embodiments is the method of translating the depth the taper gauge reaches in the kerf.

Referring now to FIG. 1A and FIG. 4A, the digital kerf apparatus 10, in practice, is used as follows. The digital kerf apparatus 10 starts in a down or starting position. A test cut kerf 46 in the die board 14 is made by a primary cutting process. The cutting process used in the preferred embodiment is a laser cutting process, but in other embodiments is a waterjet, an EDM, or any other cutting process known in the art. The test cut kerf 46 is made for measurement in the dieboard 14 in both X and Y directions. The number of test cuts varies depending on the overall quality die board desired by the operator. In some embodiments where a higher dieboard quality is desired, a variety of measurement sites or locations, anywhere on the dieboard, are pre-selected by the operator for further kerf width sampling. In a moving beam or hybrid laser system application, the digital kerf apparatus 10 is attached to its own priority position controlled, X-axis, slide actuator (not shown), residing below the fixed dieboard 14 and behind the narrow beam/fume catcher trough (not shown) approximately ⅜ inch below the bottom surface of the die board 14. The digital kerf apparatus 10 has access to the full breadth of the dieboard 14 as well as its entire length. The actual physical positioning of the digital kerf apparatus 10 below the dieboard or workpiece, as referred to in the above moving beam application, does not limit the utilization of the apparatus to the underside of the workpiece. The location of the apparatus above the workpiece, mounted adjacent to the host laser system's Z axis, for example, is also an appropriate use and capability of the apparatus should a measurement of the top of the kerf groove to be desired. Therefore, many of the digital kerf gauge's operating descriptions described herein, in particular, the vertical direction probing action, starting and stopping points, etc. of the device, would be reversed in this instance.

Figure 2A:
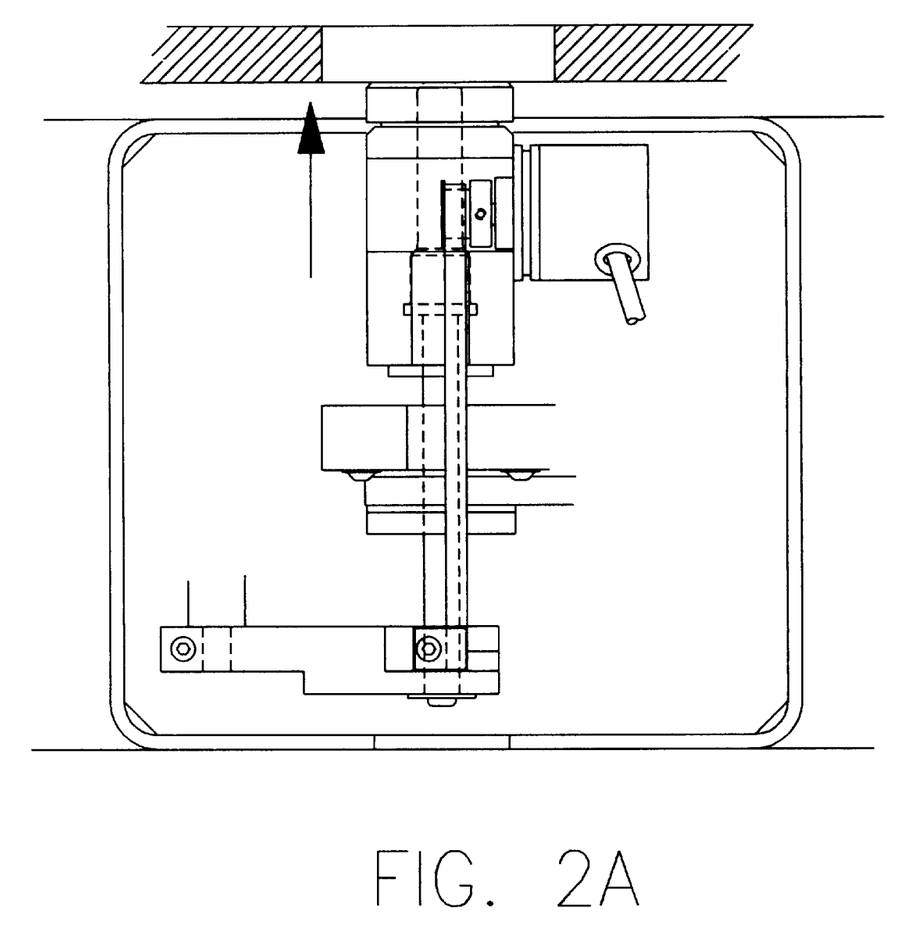
FIG. 2A is a front view of the rotary encoder embodiment of the digital kerf apparatus contacting the dieboard underside.
Figure 2B:
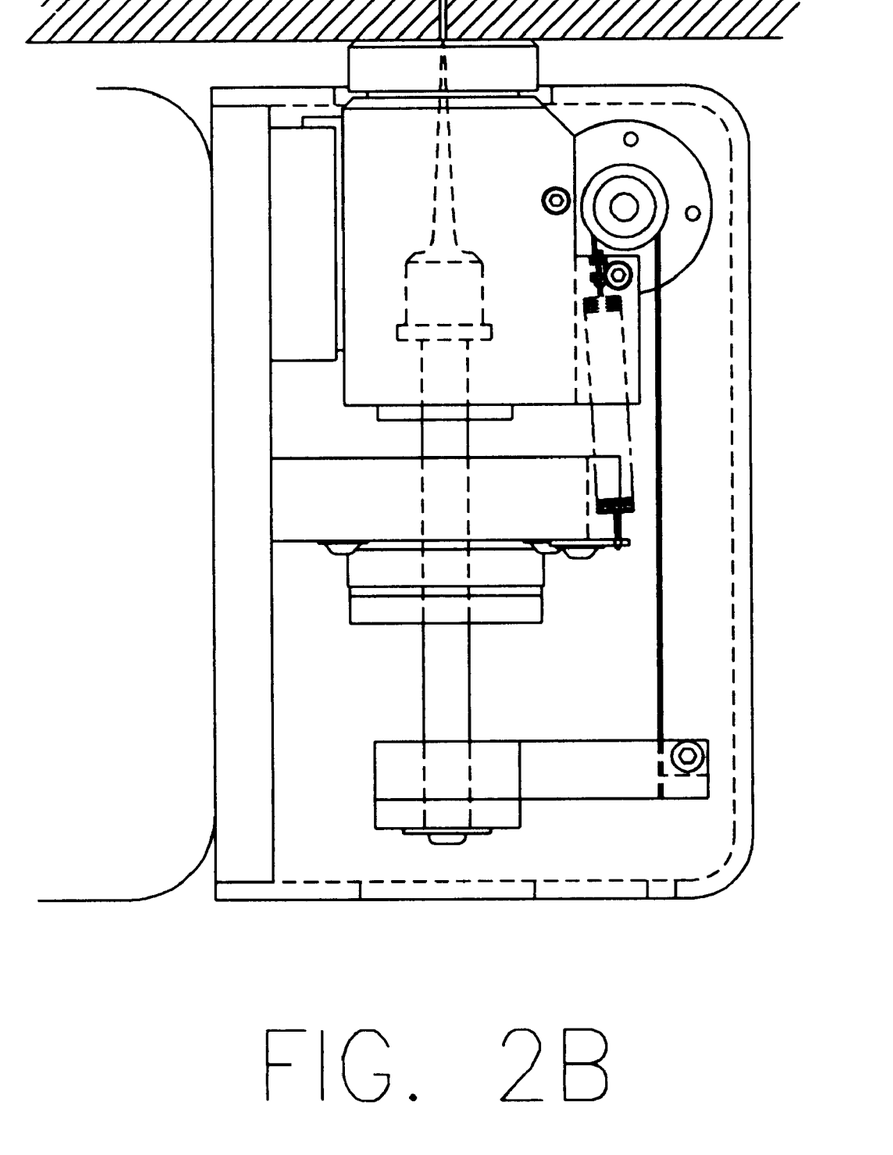
FIG. 2B is a side view of the rotary encoder embodiment of the digital kerf apparatus contacting the dieboard underside.
Figure 3A:
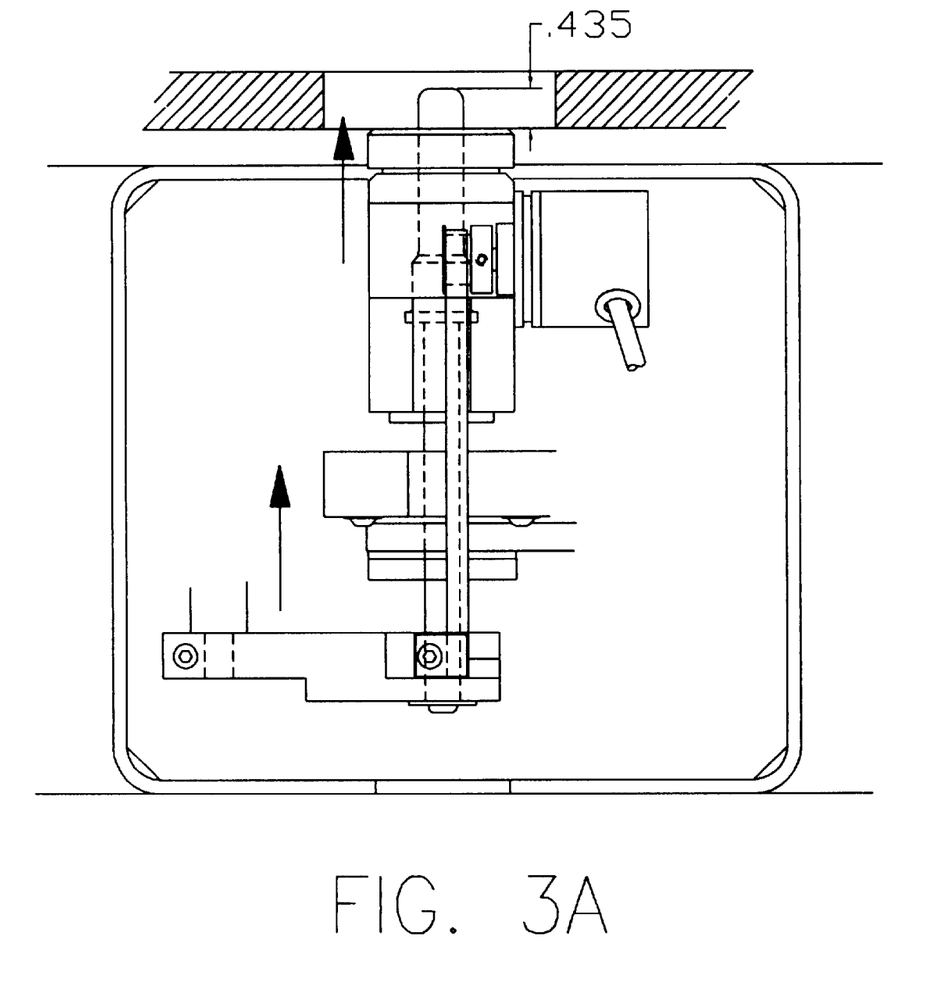
FIG. 3A is a front view of the rotary encoder embodiment of the digital kerf apparatus where the taper gauge is probing the dieboard kerf.
Figure 3B:
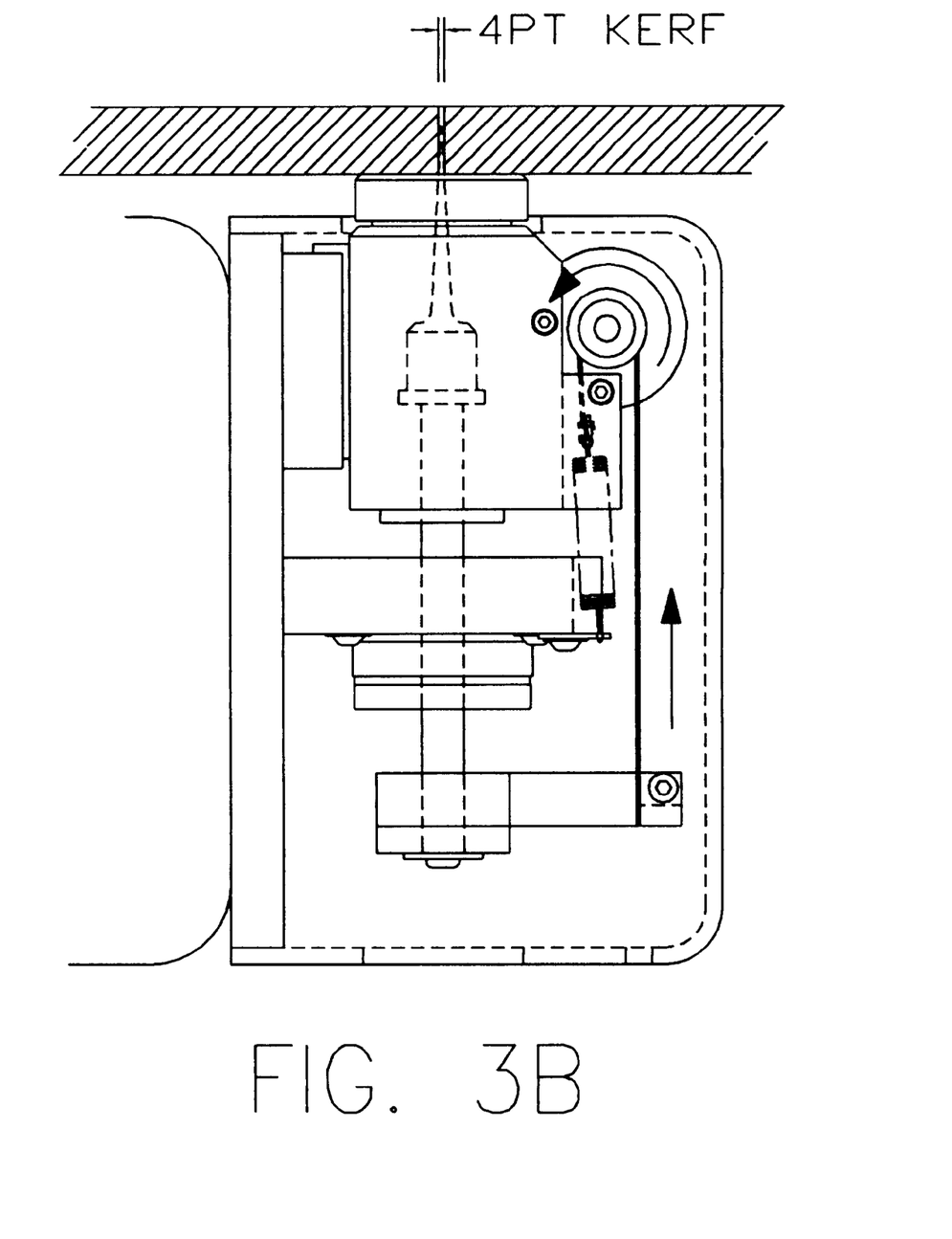
FIG. 3B is a side view of the rotary encoder embodiment of the of the digital kerf apparatus where the taper gauge is probing the dieboard kerf.
Figure 5A:
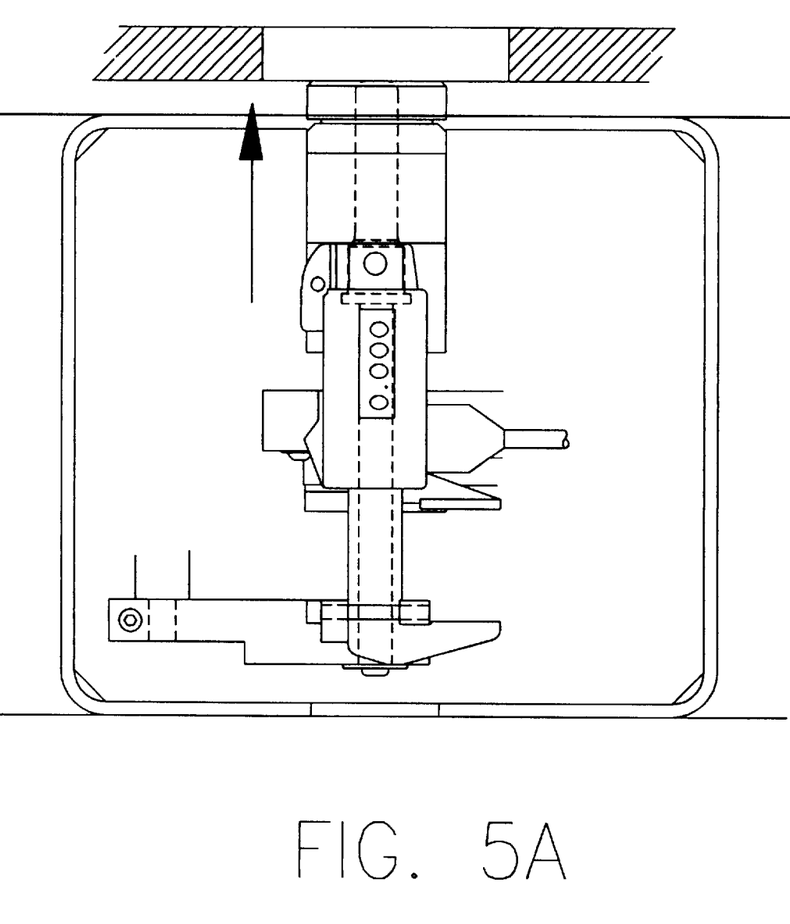
FIG. 5A is a front view of the linear digital encoder embodiment of the digital kerf apparatus contacting the dieboard underside.
Figure 5B:
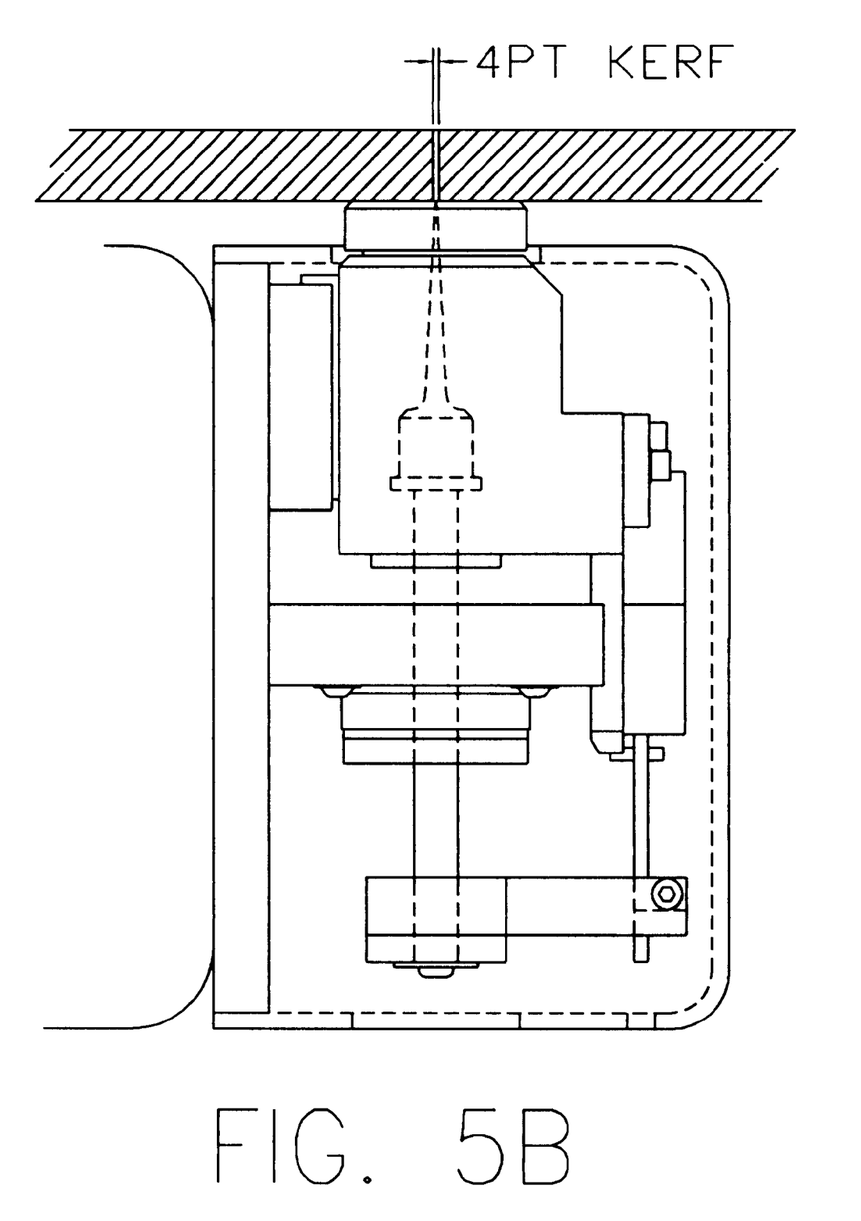
FIG. 5B is a side view of the linear digital encoder embodiment of the digital kerf apparatus contacting the dieboard underside.
Figure 6A:
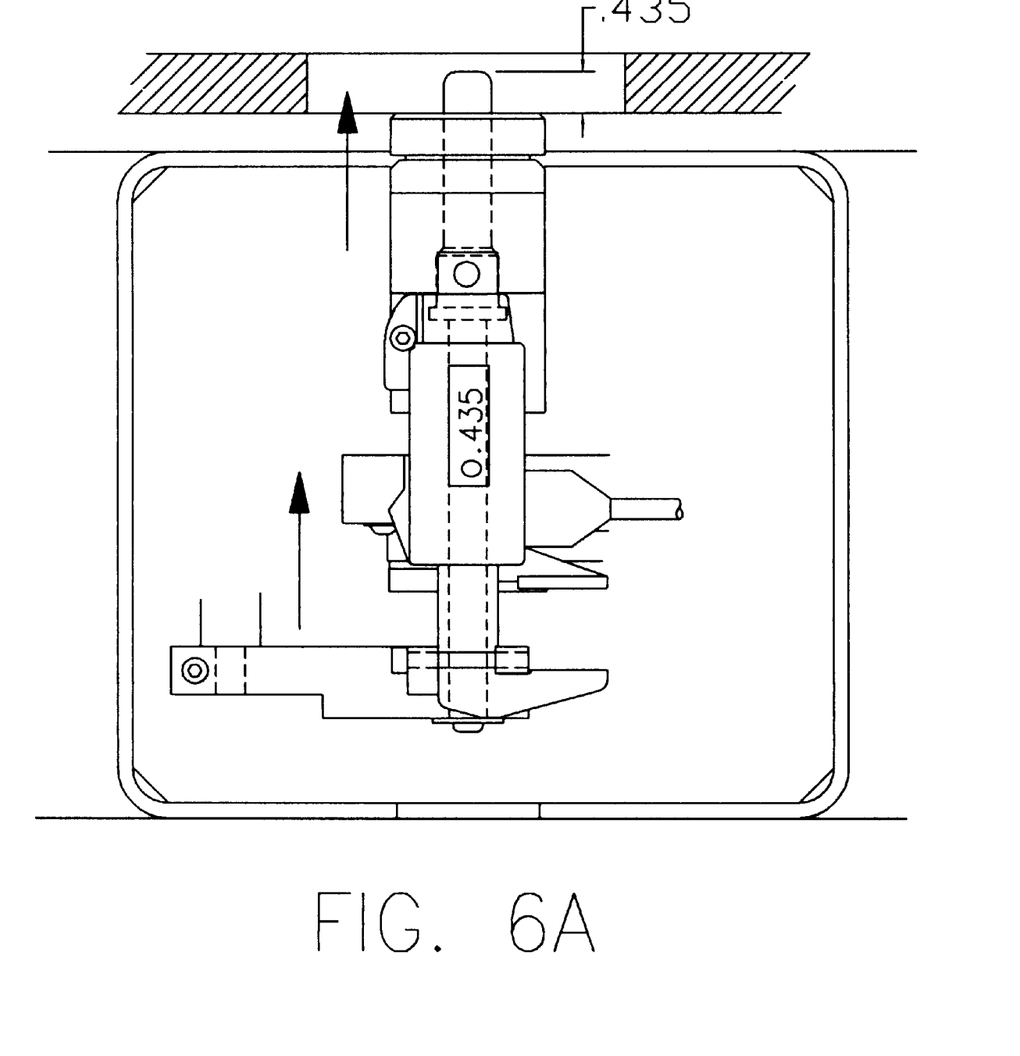
FIG. 6A is a front view of the linear digital encoder embodiment of the digital kerf apparatus with the taper gauge probing the dieboard kerf.
Figure 6B:
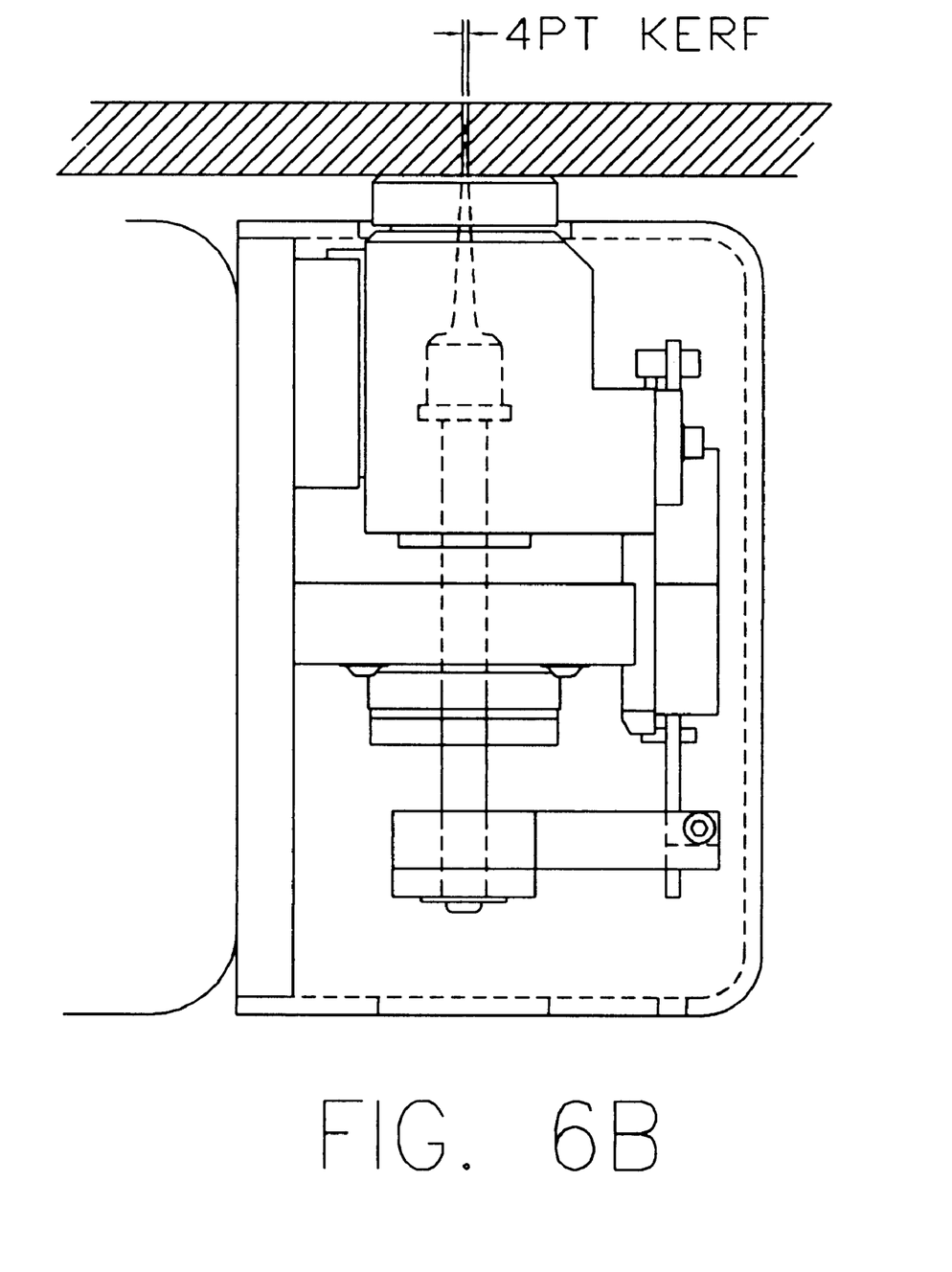
FIG. 6B is a side view of the linear digital encoder embodiment of the digital kerf apparatus with the taper gauge probing the dieboard kerf.

Still referring to FIG. 1A and FIG. 4A, when the digital kerf apparatus 10 reaches a predetermined measurement local 46 and predetermined kerf direction on the dieboard (the main Y-axis will also be used in this instance) the taper gauge 12 will rotate to a position (starting position) parallel to the kerf 46, and a report from the device's current encoder position will be gathered and presented to the machine control computer and logged for future comparison. Referring now to FIG. 2B and FIG. 5B, the stroke cylinder 40 will then actuate upward, the top rim guard 25 making contact with the flat surface of the dieboard 14 halting the gauge housing 24 vertical travel. Referring next to FIG. 3A and FIG. 6A, the taper gauge 12 will probe into the kerf 46 until stopping, having reached a preset (force) air pressure limit (stopping point). A second report from the measurement apparatus 15 is taken. Referring now to FIG. 3A, depending on the distance the pulley 16 has traveled from the first report to the second, and, referring to FIG. 6B, depending on the distance the digital encoder 50 has traveled on the vertical X axis carriage plate 28, the apparatus's 10 stopping position will be captured, logged, and analyzed for possible machine control command corrections, should a predetermined threshold parameter be exceeded. The apparatus 10 will then actuate back to its down position (shown in FIG. 1A and FIG. 4A) and return to a far right or left position thus avoiding potential contaminates normally created by the cutting system's process.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An in-process kerf measuring device for measuring a kerf made from a cutting device, comprising:

a taper gauge having a top and bottom, said taper gauge being a predetermined shape and size and capable of probing said kerf;

a spring coiled around said taper gauge;

a shaft having a top and a bottom, said top of said shaft in mating relation to said bottom of said taper gauge;

a horizontal connecting plate having a resting position, said bottom of said shaft slidably attached to said horizontal connecting plate;

stroke means, wherein said stroke means is in connected relation to said horizontal connecting plate;

measurement means for measuring said kerf; and means for actuation of said device wherein said means for actuation rotates said device along an X or Y axis; wherein said means for actuation rotates said device to a starting position, said stroke means thrusts said horizontal connecting plate upward, thrusting said taper gauge, spring, shaft upward compressing said spring and said top of said taper gauge probes said kerf until reaching a stopping position, whereby measures said kerf by comparing said starting and said stopping position.

2. The device claimed in claim 1 wherein said stroke means is a vertical hydraulic cylinder.

3. The device claimed in claim 1 wherein said measuring means is a rotary encoder.

4. The device claimed in claim 3 wherein said means for actuation is a rotary vane air cylinder.

5. The device claimed in claim 3 wherein said means for actuation is a stepper motor.

6. The device claimed in claim 1 wherein said measuring means is a linear digital encoder.

7. The device claimed in claim 6 wherein said means for actuation is a rotary vane air cylinder.

8. The device claimed in claim 6 wherein said means for actuation is a stepper motor.

9. A method of in-process kerf measuring for measuring a kerf made from a cutting device, comprising the steps of:

rotating a kerf measuring device to a starting position, said device comprising:

a taper gauge having a top and bottom, said taper gauge being a predetermined shape and size and capable of probing said kerf;

a spring coiled around said taper gauge;

a shaft having a top and a bottom, said top of said shaft in mating relation to said bottom of said taper gauge;

horizontal connecting plate having a resting position, said bottom of said shaft rotatably and vertically attached to said horizontal connecting plate;

stroke means, wherein said stroke means is in connected relation to said horizontal plate;

measurement means for measuring said kerf; and means for actuation of said device wherein said means for actuation rotates said device along an X or Y axis;

thrusting said horizontal connecting plate upward;

thrusting said shaft upward;

compressing said spring;

probing said kerf with said taper gauge until reaching a stopping position; and returning to said starting position.

10. The method claimed in claim 9 wherein said stroke means is a vertical hydraulic cylinder.

11. The method claimed in claim 9 wherein said measuring means is a rotary encoder.

12. The device claimed in claim 11 wherein said means for actuation is a rotary vane air cylinder.

13. The device claimed in claim 11 wherein said means for actuation is a stepper motor.

14. The device claimed in claim 9 wherein said measuring means is a linear digital encoder.

15. The device claimed in claim 14 wherein said means for actuation is a rotary vane air cylinder.

16. The device claimed in claim 14 wherein said means for actuation is a stepper motor.

17. The device claim in claim 1 further comprising means for sending and collecting measurement data to a control system for automatic analysis and processing.

* * * * *